Patented Sept. 8, 1936

2,054,026

UNITED STATES PATENT OFFICE 2,054,026

PROCESS FOR PRESERVING GREEN FODDER

Adolf Steindorff, Kaspar Pfaff, and Wilhelm Staudermann, Frankfort-on-the-Main-Hochst, and Adolf Johannsen and Fritz Spoun, Ludwigshafen-on-the-Rhine, Germany, assignors to I. G. Farbenindustrie Aktiengesellschaft, Frankfort-on-the-Main, Germany No Drawing. Application September 20, 1933, Serial No. 690,286. In Germany May 6, 1932

6 Claims. (Cl. 99—8)

The present invention relates to agents and a process for preserving green fodder.

This invention is based on the observation that green fodder can advantageously be preserved with the aid of a wetting agent. The latter may be used in conjunction with substances which are suitable for preserving green fodder in silos, such as, for instance, hydrochloric acid, formic acid, lactic acid or the like. As wetting agents there may be used those which have a good wetting action in an acid medium, particularly sulfonic acids or their salts, for instance those of substituted naphthalenes, such as isopropylnaphthalenesulfonic acid, benzylnaphthalenesulfonic acid or dibutylnaphthalenesulfonic acid or a naphthalenesulfonic acid condensed with formaldehyde; furthermore, bodies derived from higher fatty acids, such as sulfonated fatty acids or higher fatty acids esterified with oxyalkylsulfonic acids, for instance, isethionic acid, or linked in the manner of an amide with an aminoalkylsulfonic acid, for instance, taurine.

The use of a preserving agent, which contains a wetting agent besides a substance known for preserving purposes involves the advantage that the acid penetrates into the vegetable matter very rapidly. The preserving agent, therefore, has a very uniform and complete action. The proportion of the preserving acid to the wetting agent may be varied within wide limits; generally, however, the amount of wetting agent used is much smaller than that of acid. If desired, the concentration of the acid may be lower than otherwise usual if a wetting agent is simultaneously added.

It is also possible to preserve green fodder in silos by using wetting agents alone, and entirely omitting acids or other substances which have already been used for the same purpose. The use of wetting agents involves the advantage that the green fodder becomes uniformly soaked with liquid so that the fodder packs tightly and access of air is prevented to a great extent. Consequently the fermentation takes a favorable course and a fodder of high value is obtained. As wetting agents there may be used besides those above named, for instance various sulfonated oils, as for example sulfonated solar oils or Edeleanu oil or the like.

Instead of the acid preserving agents there may also be added substances which form acids by addition of water. A solution suitable for preserving green fodder in silos is, for instance, obtained by causing a sulfuryl chloride, such as $SO_2Cl_2$ or $S_2O_5Cl_2$, to react with water in the presence of a small amount of a wetting agent stable to acids. We have found that when the said substances are present the reaction of the sulfuryl chlorides with water, which otherwise only proceeds very slowly, is accelerated to such an extent that it proceeds to completion in a short time and at room temperature. It is not even necessary to stir or agitate the liquid. In most cases it is sufficient to add the wetting agent in amounts up to about 2 per cent. The wetting agent may be added to the sulfuryl chloride or to the water or to both. This method allows of a rapid, convenient, and safe manufacture of dilute acids from a substance which contains the said acids in a highly concentrated form and which may easily be packed and sent to the place of intended use in ordinary iron packings, such as pots, barrels, or tank wagons, without any danger of corrosion.

It is also possible to cause the sulfuryl chlorides to react with water in the presence of wetting agents which are only temporarily stable to the aqueous hydrochloric acid and sulfuric acid formed by the reaction and which then decompose with formation of products having no wetting effect. Such wetting agents are, for instance, the sulfuric esters of high-molecular alcohols corresponding to the acids of fats and oils and also ester-like fat bodies with a true sulfo group in the side chain, as the esters derived from high-molecular fatty acids and oxyalkylsulfonic acids, etc. The use of wetting agents of the kind described warrants a good moistening of the green fodder to be preserved; during the usual storage of the green fodder for several months, however, the wetting agent entirely decomposes in the acid medium while forming harmless decomposition products.

Finally, instead of ready-made wetting agents there may also be used substances which under the action of the sulfuryl chlorides and, if desired, with the co-action of water, are converted into wetting agents, which are at least temporarily stable to the aqueous acids formed. Such substances are above all oxygen-containing organic compounds, for instance, alcohols, aldehydes, carboxylic acids, esters and the like, particularly the high-molecular compounds, furthermore unsaturated or aromatic hydrocarbons, their chlorinated derivatives, etc. There may be named as examples: lauric acid, oleic acid, oleyl alcohol, fats, sugars, dextrine, starch, benzene, their homologues or chlorine derivatives. These substances are preferably added to the sulfuryl chloride before it is brought into contact with water.

In order to prove that the preserving agents have no injurious influence on animals fed with them, rabbits and cows were fed for some time with green fodder which contained larger amounts of wetting agent than that ordinarily necessary for preserving it. On a thorough examination, also of the internal organs, the animals did not show any sign of harm in comparison with the animals fed with the usual green fodder.

The following examples illustrate the invention, the parts being by weight unless otherwise stated:

1. 100 kilos of young green fodder are moistened with 5 kilos of hydrochloric acid of 6 per cent. strength to which has been added 10 grams of sodium benzylnaphthalene-sulfonate. The green fodder is filled in the usual manner into silos, no further treatment being necessary.

2. 100 kilos of green fodder are moistened when charged into a silo with 5 liters of a solution of 0.5 per cent. strength of sodium benzylnaphthalene-sulfonate.

3. Into 95 parts of water there are introduced 5 parts of sulfuryl chloride ($SO_2Cl_2$) mixed with 0.5 per cent. of a wetting agent known under the trade-name of "Nekal A", a polynaphthalene sulphonic acid, (cf. Ullmann, "Enzyklopädie der technischen Chemie" 2nd edition, volume 7, page 798). After a few seconds a vivid, but not explosive, reaction sets in which leads within about 1 to 2 minutes with gentle heating to a complete transformation of the sulfuryl chloride into hydrochloric acid and sulfuric acid. An aqueous acid solution is obtained the acidity of which corresponds to a hydrochloric acid solution of about 5 per cent. strength and which is distinguished by a good wetting effect. With the solution so obtained green fodder is preserved in silos in the usual manner.

4. Into 95 parts of water there are introduced 5 parts of a sulfuryl chloride mixed with 1% of the sulfuric ester of the alcohols corresponding to the fatty acids of coconut oil which mixture has preliminarily been stored for several weeks. The sulfuryl chloride is completely transformed in the course of a few minutes. An aqueous solution of sulfuric acid and hydrochloric acid is obtained, the acidity of which corresponds to a hydrochloric acid of about 5 per cent. strength.

Instead of the above named sulfuric esters there may also be used additions of 0.5–1% of the sodium salt of the oleylhydroxyethane-sulphonic acid.

In both cases the esters are decomposed in the resultant dilute acide solution after some time. Green fodder is preserved in silos in the usual manner with the aid of the solution thus prepared.

5. Into 95 parts of water there are introduced at ordinary temperature 5 parts of a sulfuryl chloride mixed with 4% of oleic acid. After several minutes the sulfuryl chloride is completely transformed. An aqueous acid solution is obtained the acidity of which corresponds to a hydrochloric acid solution of about 5 per cent. strength and which may advantageously be used for preserving green fodder. It is also possible to preserve green fodder in silos with a solution containing sulfuryl chloride to which 0.5 per cent. of a bitumen melting at 72° C. has been added.

We claim:

1. The process which comprises moistening green fodder with an aqueous liquid comprising a wetting agent having a wetting effect in acid solutions and an acid known to have a green fodder preserving effect.

2. The process which comprises moistening green fodder with an aqueous liquid comprising a wetting agent having a wetting effect in acid solutions and a mineral acid.

3. The process which comprises moistening green fodder with an aqueous liquid comprising a wetting agent having a wetting effect in acid solutions and a substance yielding mineral acids in the presence of water.

4. The process which comprises moistening green fodder with an aqueous solution of a strong mineral acid and a wetting agent of the naphthalene sulfonic acid series.

5. The process which comprises moistening green fodder with an aqueous solution of hydrogen chloride and benzylnaphthalene sulfonic acid.

6. The process which comprises moistening green fodder with an aqueous solution prepared by adding to water sulfuryl chloride and the sodium salt of isopropylnaphthalene sulfonic acid.

ADOLF STEINDORFF.
KASPAR PFAFF.
WILHELM STAUDERMANN.
ADOLF JOHANNSEN.
FRITZ SPOUN.